United States Patent
Lichtenberg et al.

(10) Patent No.: US 10,341,298 B1
(45) Date of Patent: Jul. 2, 2019

(54) SECURITY RULES FOR APPLICATION FIREWALLS

(71) Applicant: Amazon Technologies, Inc., Seattle, WA (US)

(72) Inventors: Kyle Adam Lichtenberg, Issaquah, WA (US); Patrick Edward McDowell, New York, NY (US); Matthew Gordon Yanchyshyn, Brooklyn, NY (US)

(73) Assignee: Amazon Technologies, Inc., Seattle, WA (US)

(*) Notice: Subject to any disclaimer, the term of this patent is extended or adjusted under 35 U.S.C. 154(b) by 174 days.

(21) Appl. No.: 15/084,421

(22) Filed: Mar. 29, 2016

(51) Int. Cl.
H04L 29/06 (2006.01)

(52) U.S. Cl.
CPC ...... H04L 63/0263 (2013.01); H04L 63/0428 (2013.01)

(58) Field of Classification Search
None
See application file for complete search history.

(56) References Cited

U.S. PATENT DOCUMENTS

| | | | | |
|---|---|---|---|---|
| 6,041,349 A * | 3/2000 | Sugauchi | ............... | H04L 41/22 709/218 |
| 6,212,558 B1 * | 4/2001 | Antur | ............... | H04L 41/0893 709/203 |
| 7,549,174 B1 * | 6/2009 | Falkner | ............... | G06F 21/602 380/277 |
| 7,665,118 B2 * | 2/2010 | Mann | ............... | H04L 41/0893 380/270 |
| 7,853,998 B2 * | 12/2010 | Blaisdell | ............... | H04L 63/102 713/153 |
| 7,926,090 B2 * | 4/2011 | Blevins | ............... | H04L 41/0856 713/193 |
| 8,620,774 B1 * | 12/2013 | Li | ............... | G06Q 30/06 705/27.1 |
| 8,868,701 B1 * | 10/2014 | Peters | ............... | G06F 9/541 709/221 |
| 9,027,077 B1 * | 5/2015 | Bharali | ............... | H04L 63/02 726/1 |
| 9,621,516 B2 * | 4/2017 | Basak | ............... | H04L 63/0263 |

(Continued)

*Primary Examiner* — Piotr Poltorak
(74) *Attorney, Agent, or Firm* — Thorpe North & Western, LLP.

(57) ABSTRACT

A technology is described for applying an encrypted customer security rule set to an application firewall. An example method may include obtaining an encrypted customer security rule from a shared data store for use by an application firewall that operates at an entry point to a computing service environment that utilizes security rules to monitor, filter, and manipulate network traffic. The customer encryption key used to decrypt the encrypted customer security rule in volatile computer memory may be obtained from a key data store and the encrypted customer security rule may be decrypted in the volatile computer memory using the customer encryption key, thereby forming a corresponding unencrypted customer security rule in the volatile computer memory. A volatile computer memory location containing the unencrypted customer security rule may be provided to the application firewall to enable the unencrypted customer security rule to be applied by the application firewall.

20 Claims, 8 Drawing Sheets

(56) References Cited

U.S. PATENT DOCUMENTS

| | | | |
|---|---|---|---|
| 2004/0103202 A1* | 5/2004 | Hildebrand | G06F 21/6209 709/229 |
| 2004/0225541 A1* | 11/2004 | Porter | G06Q 10/063 705/70 |
| 2006/0047859 A1* | 3/2006 | Cavalaris | G06F 9/4411 710/8 |
| 2006/0147043 A1* | 7/2006 | Mann | H04L 41/0893 380/270 |
| 2007/0005542 A1* | 1/2007 | Echeverria | G06N 5/02 706/47 |
| 2007/0180490 A1* | 8/2007 | Renzi | G06F 21/577 726/1 |
| 2007/0283144 A1* | 12/2007 | Kramer | H04L 63/0263 713/164 |
| 2008/0034205 A1* | 2/2008 | Alain | G06F 21/6209 713/160 |
| 2008/0163207 A1* | 7/2008 | Reumann | G06F 9/5077 718/1 |
| 2009/0007100 A1* | 1/2009 | Field | G06F 21/53 718/1 |
| 2009/0210721 A1* | 8/2009 | Phillips | G06F 21/6218 713/182 |
| 2009/0249472 A1* | 10/2009 | Litvin | H04L 63/0263 726/14 |
| 2010/0100967 A1* | 4/2010 | Douglas | H04L 63/102 726/27 |
| 2010/0262828 A1* | 10/2010 | Brown | H04L 9/0844 713/171 |
| 2010/0309878 A1* | 12/2010 | Stolyar | H04W 88/005 370/331 |
| 2010/0333165 A1* | 12/2010 | Basak | H04L 63/0263 726/1 |
| 2014/0006798 A1* | 1/2014 | Prakash | G06F 21/6218 713/189 |
| 2015/0082033 A1* | 3/2015 | Bruce | G06F 9/54 713/168 |
| 2015/0082417 A1* | 3/2015 | Bhagwat | H04L 63/0263 726/13 |
| 2015/0237013 A1* | 8/2015 | Bansal | H04L 63/0263 726/13 |
| 2016/0117355 A1* | 4/2016 | Krishnamurthy | G06F 17/30345 707/749 |
| 2017/0063793 A1* | 3/2017 | Galbreath | H04L 63/0263 |

* cited by examiner

SECURITY RULES FOR APPLICATION FIREWALLS

BACKGROUND

An application firewall is a network security device used to control input and output to and from an application or service. An application firewall may operate by monitoring and potentially blocking input, output, and/or system service calls that do not meet a configured policy of the application firewall. An application firewall may be deployed within a computing service environment to protect applications and services executing within the computing service environment from exploits that could affect application availability, compromise security, or consume excessive resources. Computing service customers may be provided some measure of control over which network traffic to allow or block to the customer's applications by allowing the customers to define customizable security rules. For example, a customer may create custom security rules that block common attack patterns, such as SQL injections or cross-site scripting.

DETAILED DESCRIPTION

A technology is described for securely loading encrypted customer security rule sets on an application firewall operating at an entry point to a computing service environment. The application firewall utilizes the customer security rule sets to monitor network traffic associated with customer applications executing in a computing service environment. Security rule sets provided by computing service customers may be proprietary to the computing service customers, and therefore, a computing service customer may encrypt the customer's security rule set using a customer encryption key. A computing service customer may provide an encryption key (e.g., created using symmetric key cryptography) used to encrypt a customer security rule set to a computing service provider, thereby allowing the computing service provider to decrypt the security rule set in volatile computer memory of a server executing an application firewall. By decrypting the encrypted security rule set in volatile computer memory, the customer's security rule set may be protected from discovery by the computing service provider and other computing service customers that utilize the application firewall.

Customer security rules or customer security rule sets may be customizable security rules that allow, block, and/or monitor application requests based on conditions defined by a computing service customer. Conditions defined by a customer may relate to, but are not limited to: Internet Protocol (IP) addresses, Hypertext Transfer Protocol (HTTP) headers, HTTP body, Uniform Resource Identifier (URI) strings, and Structured Query Language (SQL) injections.

In one example, a customer may create a customer encryption key using a key management service and encrypt a security rule set owned by the customer using the customer encryption key. The customer may also create a cross-account security role for a computing service provider that allows the computing service provider to obtain the customer encryption key for the purpose of decrypting the encrypted security rule set in volatile computer memory of a server executing an application firewall (e.g., a web application firewall). The customer may then store the encrypted security rule set to a shared data store that is accessible to the customer and the computing service provider.

The encrypted security rule set may be obtained from the shared data store and the customer encryption key may be obtained from the key management service using the cross-account security role created for the computing service provider. The encrypted security rule set may then be decrypted in the volatile computer memory of the server executing the application firewall, thereby forming a corresponding unencrypted security rule set in the volatile computer memory. The unencrypted security rule set located in the volatile computer memory may then be registered with the application firewall and the application firewall may then apply the unencrypted security rule set to network traffic associated with the customer's application received at the application firewall. As a result of the technology, the customer's encrypted rule set is not exposed to the computing service provider or to other customers that use the application firewall because the customer's encrypted rule set is decrypted in volatile computer memory rather than decrypted to non-volatile computer memory where an unencrypted rule set could be discovered.

Figure 1:
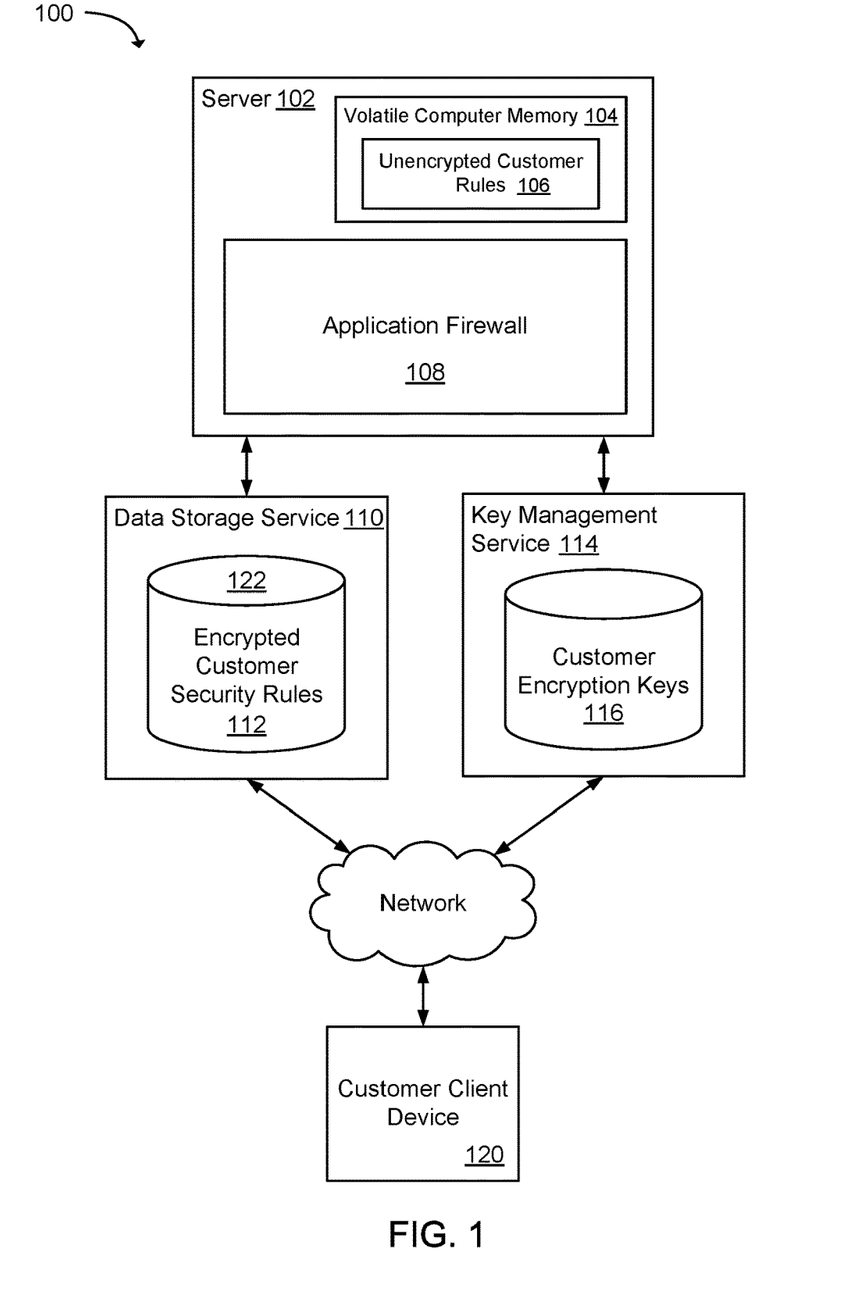
FIG. 1 is a block diagram illustrating an example system for decrypting encrypted customer security rules for use by an application firewall.

FIG. 1 is a diagram illustrating a high level example of a system 100 for decrypting encrypted customer security rules 112 in volatile computer memory 104 for use by an application firewall 108. As illustrated, the system 100 may include a server 102 (e.g., a computing instance) that hosts an application firewall 108, a data storage service 110 having a shared data store 122 containing encrypted customer security rules 112, and a key management service 114 used to manage customer encryption keys 116 and to allow access to the customer encryption keys 116 via cross-account security roles created by customers using an identity and access management system.

The application firewall 108 may be configured to protect customer applications (e.g., web applications) from security exploits that could affect the availability of a customer application, compromise security of the system 100, cause errors, or consume excessive computing resources on the server 102. The application firewall 108 may provide customer control over which network traffic to allow or block by allowing customers to define customizable customer security rules. For example, a customer may create proprietary customer security rules designed for the customer's specific application or applications in order to block recognized attack patterns, such as SQL injections or cross-site scripting. The application firewall 108 may include an Application Program Interface (API) that allows the customers to create, deploy, and maintain the customer security rules.

Because customers may want to protect their proprietary customer security rules from discovery, access, and/or use by competitors and computing service providers, the customers may encrypt their proprietary customer security rules. For example, a customer who develops a customer security rule for use by an application firewall 108 managed by a computing service provider may encrypt the customer security rule using a customer encryption key 116, thereby protecting the customer security rule from being discovered and implemented by the customer's competitors.

In one example, a customer may encrypt a customer security rule using a customer encryption key 116 managed by the key management service 114. In one example, the key management service 114 may be a managed service used to create customer encryption keys 116 using symmetric or asymmetric key cryptography and control access to the customer encryption keys 116 using cross-account security roles created via an identity and access management system (not shown). A customer encryption key 116 may be used to encrypt customer security rules. The key management service 114 may utilize Hardware Security Modules (HSMs) to protect the security of the customer encryption keys 116. A customer may use the key management service 114 to manage access to a customer encryption key 116 by way of a cross-account security role that provides an entity specified by the customer access to the customer encryption key 116. For example, a customer may use the key management service 114 (via a customer client device 120) to create a customer encryption key 116 used to encrypt a customer security rule and the customer may use a cross-account security role that provides revocable rights within a computing service environment to use the customer encryption key 116 to decrypt the encrypted customer security rule 112 in volatile computer memory 104. In another example, a customer may manage a customer encryption key 116 using the customer's own computing resources (e.g., the customer's own data store and/or private computing resources) and the customer may provide the customer encryption key 116 to a computing service provider as part of loading the customer's encrypted customer security rule 112 on the application firewall 108.

Encrypted customer security rules 112 may be stored in the shared data store 122 managed by the data storage service 110. The shared data store 122 may be accessible to a customer (or multiple customers) and a computing service provider, thereby allowing a customer (via a customer client device 120) to store encrypted customer security rules 112 to the shared data store 122, and allow a computing service provider (e.g., the owner of the computing service environment) access to the encrypted customer security rules 112 for the purpose of applying the encrypted customer security rules 112 to the application firewall 108. In one example, encrypted customer security rules 112 stored in a shared data store 122 accessible to multiple computing service customers may be protected using folder permissions for the shared data store 122. For example, a customer may be provided with write access to the shared data store 122, thereby protecting encrypted customer security rules 112 stored in the shared data store 122 from being manipulated, copied, or deleted.

A customer may store (upload) an encrypted customer security rule 112 to the shared data store 122 for the purpose of having the encrypted customer security rule 112 loaded for use by the application firewall 108. In one example, the presence of an encrypted customer security rule 112 in the shared data store 122 may be an indicator to a computing service provider to load the encrypted customer security rule 112 on the application firewall 108. For example, the shared data store 122 may be polled to determine whether an encrypted customer security rule 112 has been uploaded to the shared data store 122. In another example, after storing an encrypted customer security rule 112 to a shared data store 122, a computing service provider may be notified (e.g., using a push notice) that the encrypted customer security rule 112 has been uploaded. In some examples, encrypted customer security rules 112 may be uploaded directly to the application firewall 108.

After determining that an encrypted customer security rule 112 is available to load on the application firewall 108, the encrypted customer security rule 112 may be retrieved from the shared data store 122 and the customer encryption key 116 used to encrypt the encrypted customer security rule 112 may be obtained from the key management service 114 using the cross-account security role created for use by the computing service provider. In some examples, the computing service provider may be provided with a one-time or single-use customer encryption key 116. The encrypted customer security rule 112 may then be decrypted in the volatile computer memory 104 of the server 102 that hosts the application firewall 108. By decrypting the encrypted customer security rule 112 in volatile computer memory 104, the encrypted customer security rule 112 may be better protected from being discovered by a competitor or by the computing service provider. As an illustration, decrypting a file on a file basis, where an encrypted file is decrypted to an unencrypted file on a non-transitory storage medium (e.g., a computer hard drive) leaves the unencrypted file exposed to being discovered, thereby defeating the purpose of using encryption to protect the encrypted file. Even if the unencrypted file is immediately deleted after being loaded into volatile computer memory 104, the unencrypted file existed on the non-transitory storage medium and can be recovered from the non-transitory storage medium. Thus, to prevent recovery of an unencrypted customer rule 106 from a non-transitory storage medium, an encrypted customer security rule 112 may be decrypted in volatile computer memory 104 (e.g., volatile RAM (Random Access Memory)), thereby leaving no trace of the unencrypted customer rules 106 on a non-transitory storage medium that can be recovered.

In one example, the encrypted customer security rules 112 and the customer encryption key 116 may be moved to the volatile computer memory 104 of the server 102 where the encrypted customer security rule 112 may be decrypted. As one example, the encrypted customer security rule 112 and the customer encryption key 116 may be provided to the application firewall 108, which may be configured to decrypt the encrypted customer security rule 112 in volatile computer memory 104, thereby forming a corresponding unencrypted customer security rule 106 in the volatile computer memory 104 that may be used by the application firewall 108 to monitor network traffic. As another example, a rule management service as described in association with FIG. 2 may be used to decrypt an encrypted customer security rule 112 in volatile computer memory 104 and register the resulting unencrypted customer security rule 106 with the application firewall 108.

Figure 5:
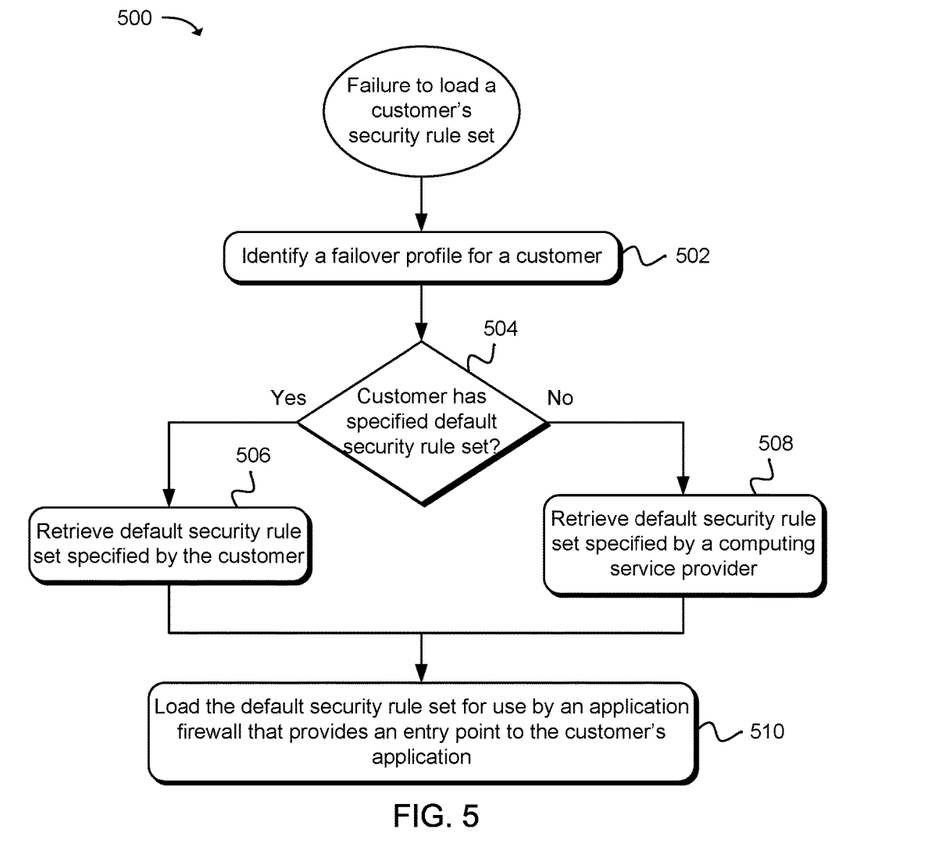
FIG. 5 is a flow diagram that illustrates an example method for failing over to a default security rule set in the event that a customer security rule set cannot be loaded for use by an application firewall.

As described in greater detail in association with FIG. 5, default security rules may be used in cases where an error related to loading an encrypted customer security rule 112 for use by the application firewall 108 may occur, such as a failure to decrypt an encrypted customer security rule 112. For example, the default security rules may be registered with the application firewall 108 for use with a customer application when encrypted customer security rules 112 cannot be registered with the application firewall 108. The default security rules may be provided by a computing service provider and a customer may approve the default security rules for use when an error associated with the customer's encrypted security rule occurs.

Because of the proprietary nature of the customer security rules, unencrypted customer security rules 106 that exist in volatile computer memory 104 may be removed from the volatile computer memory 104 upon request or upon a determination that the unencrypted customer security rules 106 should no longer be utilized by the application firewall 108. In one example, a request from a customer to discontinue utilization of an unencrypted customer security rule 106 by the application firewall 108 may result in removing the unencrypted customer security rule 106 from the volatile computer memory 104. In another example, an unencrypted customer security rule 106 may be removed from volatile computer memory 104 after a determination that rights to a customer encryption key 116 used to decrypt the unencrypted customer security rule 112 may have been revoked. As an illustration, the key management service 114 may periodically query to determine whether a cross-account security role that grants access to a customer encryption key 116 may still be active. In the case that the cross-account security role is no longer active, the unencrypted customer security rule 106 may be removed from the volatile computer memory 104.

In yet another example, removal of an encrypted customer security rule 112 from the shared data store 122 may result in removing a corresponding unencrypted customer security rule 106 from the volatile computer memory 104. For example, the data storage service 110 may monitor a shared data store 122 for changes to the content of the shared data store 122 and when an encrypted customer security rule 112 is modified or deleted, the data storage service 110 may generate a notification indicating that the encrypted customer security rule 112 has been modified or deleted. The notification may be provided to the application firewall 108 and an unencrypted customer security rule 106 that corresponds to the encrypted customer security rule 112 may be removed from the volatile computer memory 104.

After an unencrypted customer security rule 106 has been removed from volatile computer memory 104, a customer notification may be generated and sent to a customer confirming that the unencrypted customer security rule 106 has been removed from the volatile computer memory 104, thereby providing the customer with an assurance that the unencrypted customer security rule 106 is not being utilized by the application firewall 108 and that the unencrypted customer security rule 106 no longer exists on the server 102.

Figure 2:
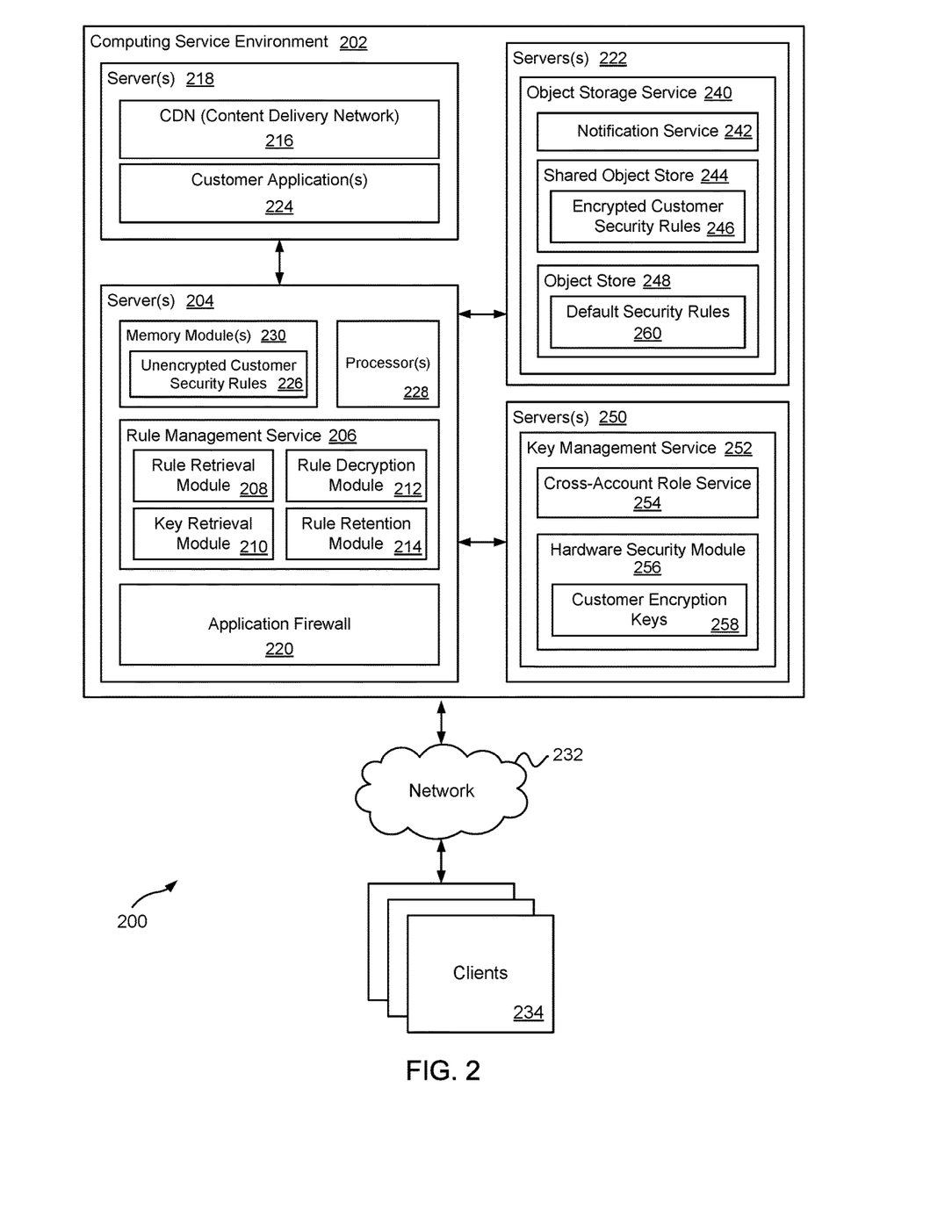
FIG. 2 is a block diagram that illustrates various example components included in a system for securely applying customer security rules to network traffic using an application firewall.

FIG. 2 illustrates components of an example system 200 on which the present technology may be executed. The system 200 may include a computing service environment 202 that may comprise a plurality of servers 204, 218, 222, and 250 for executing computing instances (e.g., virtual machines), which may be an instance of a software implementation of a machine (i.e. a computer) that executes applications like a physical machine as described in greater detail in association with FIG. 3. The servers 204, 218, 222, and 250 may host computing instances that execute an application firewall(s) 220, customer applications 224, a Content Delivery Network(s) (CDN) 216, a rule management service 206, an object storage service 222, and a key management service 252.

The application firewall 220 may be an entry point to the customer applications 224 and the CDN 216, and the application firewall 220 may be configured to filter or monitor network traffic associated with the customer applications 224 and the CDN 216. The customer applications 224 may include custom customer applications, business applications, and/or support applications (e.g., database, analytics, security) offered by a computing service provider. The CDN 216 may distribute customer content associated with a customer of the computing service provider to end users. The application firewall 220 may filter or monitor network traffic associated with multiple computing service customers using customer security rules defined by the computing service customers. For example, a computing service customer may add the application firewall 220 to the customer's computing service account resulting in pointing network traffic associated with the customer's applications to the application firewall 220. The computing service customer may define custom security rules and apply the security rules to the application firewall 220 for use in monitoring network traffic associated with the customer's applications.

The rule management service 206 may include a number of modules used to protect a customer's proprietary security rules. In one example, the rule management service 206 may include a rule retrieval module 208, a key retrieval module 210, a rule decryption module 212, and a rule retention module 214. The rule retrieval module 208 may be configured to retrieve encrypted customer security rules 246 from a shared object store 244 for the purpose of loading the encrypted customer security rules 246 for use by the application firewall 220. Encrypted customer security rules 246 retrieved from a shared object store 244 may be placed in volatile computer memory of a server 204 that hosts the application firewall 220 where the encrypted customer security rules 246 may be decrypted, forming corresponding unencrypted customer security rules 226 in the volatile computer memory. As such, copies of the unencrypted customer security rules 226 are not saved to non-transitory storage (e.g., a hard drive) on the server 204, thereby preventing the unencrypted customer security rules 226 from being recovered from non-transitory storage.

The shared object store 244 may be accessible to both a computing service provider (i.e., a computing service agent) and one or more computing service customers. A computing service customer may store encrypted customer security rules 246 created and encrypted by the computing service customer in the shared object store 244 in order to make the encrypted customer security rules 246 accessible to a computing service provider.

In one example, the rule retrieval module 208 may be configured to monitor the shared object store 244 for encrypted customer security rules 246 that have been added to the shared object store 244. In another example, the object storage service 240 may include a notification service 242 configured to notify the rule management service 206 when an encrypted customer security rule 246 has been added to the shared object store 244. In the event that an encrypted customer security rule 246 has been added to the shared object store 244, the rule retrieval module 208 may retrieve the encrypted customer security rule 246 from the shared object store 244 and place the encrypted customer security rule 246 in volatile computer memory on the server 204. In another example, the object storage service 240 may push (e.g., using a push channel) encrypted customer security rules 246 to volatile computer memory on the server 204 in response to the encrypted customer security rule 246 being added to the shared object store 244.

The key retrieval module 210 included in the rule management service 206 may be configured to retrieve a customer encryption key 258 from the key management service 252 for the purpose of decrypting an encrypted customer security rule 246 located in the volatile computer memory of the server 204. The key management service 252 may include hardware security modules 256 used to securely store customer encryption keys 258. A customer encryption key 258 may be retrieved using a cross-account role that grants the rule management service 206 revocable rights to the customer encryption key 258.

A cross-account role service 254 included in the key management service 252 may be used by a computing service customer to obtain and manage cross-account roles as defined in the computing service environment 202. For example, a computing service customer may create a cross-account role that grants the rule management service 206 rights to a customer encryption key 258 used to encrypt an encrypted customer security rule 246, and the computing service customer may revoke the rights to the customer encryption key 258 at any time by modifying or deleting the cross-account role. The key retrieval module 210 included in the rule management service 206 may be configured to monitor the status of a cross-account role granted to the rule management service 206 to determine whether rights to a customer encryption key 258 have been revoked by a customer of the computing service environment via modification or deletion of the cross-account role. In one example, revoking the rights to a customer encryption key 258 (via a cross-account role) may result in removing an unencrypted customer security rule 226 associated with the customer encryption key 258 from volatile computer memory of the server 204.

The rule decryption module 212 included in the rule management service 206 may be configured to decrypt an encrypted customer security rule 246 in volatile computer memory of the server 204 using a customer encryption key 258 retrieved by the key retrieval module 210. More specifically, the encrypted customer security rule 246 may be decrypted in volatile computer memory forming a corresponding unencrypted customer security rule 226 in the volatile computer memory. The unencrypted customer security rule 226 may be registered with the application firewall 220 and the application firewall 220 may apply the unencrypted customer security rule 226 to network traffic associated with the computing service customer received at the application firewall 220. After decrypting the encrypted customer security rule 246, the encrypted customer security rule 246 may be removed from the volatile computer memory by releasing the memory containing the encrypted customer security rule 246 back to a memory heap for reallocation.

In some examples, the rule decryption module 212 may be further configured to update an application firewall profile to show that a customer's unencrypted customer security rule 226 is currently being applied by the application firewall 220 to network traffic associated with the computing service customer. The application firewall profile may provide a record of unencrypted customer security rules 226 that are currently being utilized by the application firewall 220 and may be used to show a computing service customer that the customer's unencrypted customer security rule 226 exists in volatile computer memory of the server 204. For example, customer reporting on active and inactive customer security rules may be performed by querying an application firewall profile.

The rule retention module 214 included in the rule management service 206 may be configured to implement a retention policy for unencrypted customer security rules 226 being utilized by the application firewall 220. In one example, the rule retention module 214 may be configured to monitor a shared object store 244 to identify a removal of encrypted customer security rules 246. In the event that an encrypted customer security rule 246 has been removed from the shared object store 244, the rule retention module 214 may be configured to instruct the application firewall 220 to deregister a corresponding unencrypted customer security rule 226 and release the memory containing the unencrypted customer security rule 226 back to the memory heap for reallocation, thereby removing the unencrypted customer security rule 226 from the volatile computer memory.

In another example, the rule retention module 214 may receive a notification from a notification service 242 included in the object storage service 240 that an encrypted customer security rule 246 has been removed from a shared object store 244. In response, the rule retention module 214 may instruct the application firewall 220 to deregister a corresponding unencrypted customer security rule 226 and release the memory containing the unencrypted customer security rule 226.

In yet another example, the rule retention module 214 may be configured to monitor the status of a cross-account role that grants the rule management service 206 rights to a customer encryption key 258 that was used to decrypt an unencrypted customer security rule 226 being utilized by the application firewall 220. In the event that a cross-account role may no longer be active, a corresponding unencrypted customer security rule 226 may be deregistered from the application firewall 220 and the memory containing the unencrypted customer security rule 226 may be released.

In cases where a customer's unencrypted customer security rule 226 may be deregistered from the application firewall 220 and a replacement customer security rule is unavailable to take the place of the deregistered unencrypted customer security rule 226, a default security rule 260 may be obtained (e.g., from an object store 248 in the object storage service 240 or from another data store) and registered with the application firewall 220. The default security rule 260 may then be used to monitor network traffic associated with the computing service customer. The computing service customer may specify in advance that the default security rule 260 should be used in the event of a failure to load the customer's encrypted customer security rule 246.

In some examples, the rule management service 206 may be further configured to update an application firewall profile with instructions to failover to a default security rule 260 specified by the computing service customer or by a computing service provider in response to a failure to load a customer's encrypted customer security rule 246 for use by the application firewall 220. As such, in the event of a failure, the application firewall profile can be referenced and the default security rule 260 can be identified and loaded for use by the application firewall 220.

A computing service customer may utilize a client 234 to manage the customer's encrypted customer security rules 246 and customer encryption keys 258. End users of customer applications 224 and CDN 216 may also use a client 234 to access the customer applications 224 and the CDN 216. A client 234 may include a service or a client device that sends and receives data over a network 232. A client device may comprise, for example a processor-based system such as a computing device.

The various processes and/or other functionality contained within the system 200 may be executed on one or more processors 228 that are in communication with one or more memory modules 230. The memory modules 230 may include volatile computer memory. The system 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the computing service environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 232 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
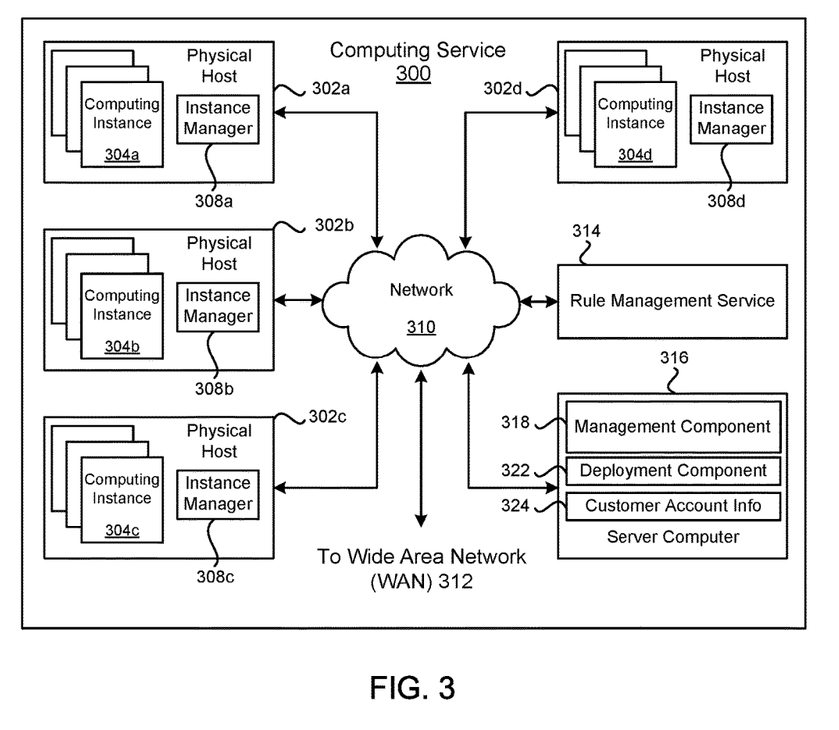
FIG. 3 is a block diagram that illustrates an example computing service environment that includes a rule management service used to securely load customer security rules for use by an application firewall.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a rule management service configured to apply encrypted customer security rules to application firewalls that execute on the computing instances 304a-d.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
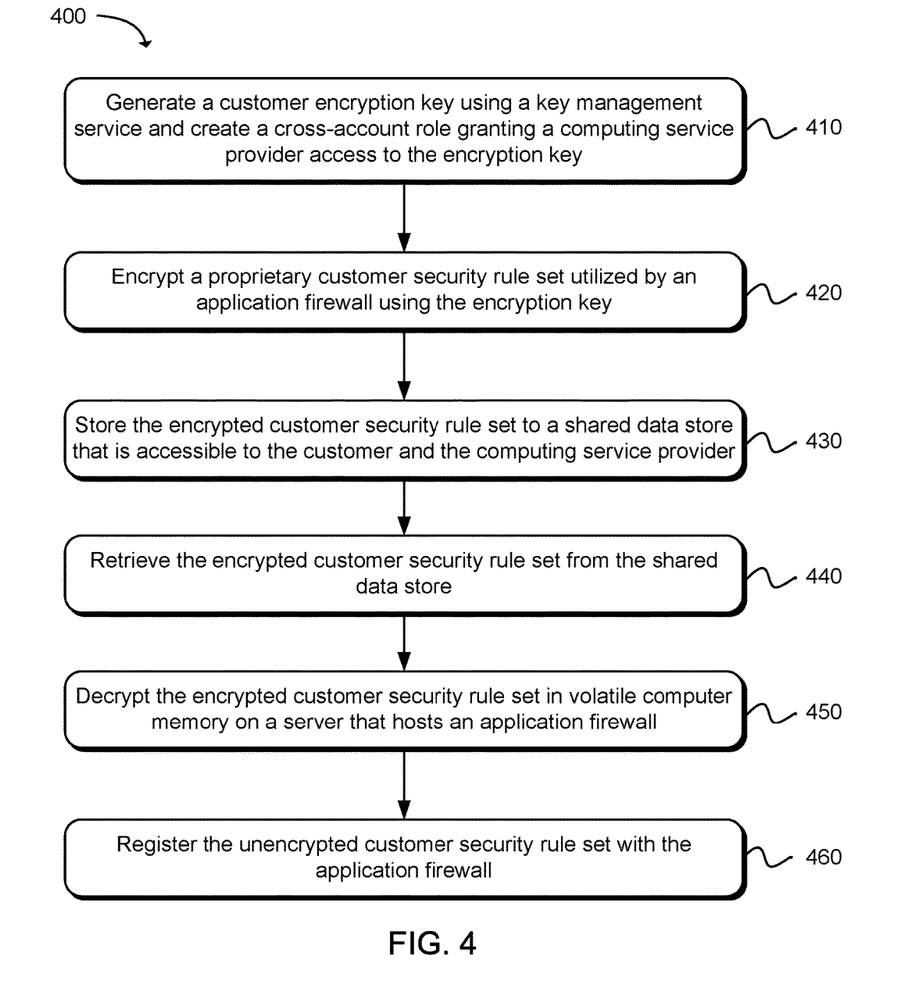
FIG. 4 is a flow diagram illustrating an example method for securely decrypting a customer security rule set for use by an application firewall provided by a computing service provider.

Moving now to FIG. 4, a flow diagram illustrates an example method 400 for securely loading a proprietary customer security rule set on an application firewall that may be provided to customers as a service by a computing service provider. The customers' proprietary customer security rule sets may include filter rules and algorithms that may extend and enhance the functionality of an application firewall.

The example method 400 may allow customers who may be reluctant to load proprietary customer security rule sets on the application firewall due to concerns that the customer security rule sets may be discovered or shared with other customers to encrypt the customer security rule sets and have the encrypted customer security rule sets securely decrypted and loaded in volatile computer memory for use by the application firewall. Starting in block 410, a customer may generate a customer encryption key using a key management service. The key management service may be used by customers to create and control access to customer encryption keys. The key management service may utilize HSMs to protect the security of customer encryption keys. Also, the key management service may be used to create and manage cross-account security roles that provide a computing service provider (e.g., a software agent) revocable rights to a customer encryption key. Accordingly, the customer may use the key management service to create a cross-account role that grants a computing service provider access to the encryption key.

As in block 420, the customer may use the encryption key created using the key management service to encrypt the customer security rule set, and as in block 430, store the encrypted customer security rule set to a shared data store that may be accessible to the customer and the computing service provider. In encrypting the customer security rule set, the customer security rule set may be protected while the customer security rule set is stored in the shared data store. Namely, other customers and the computing service provider may not be able to access the encrypted customer security rule set.

After the encrypted customer security rule set has been stored to the shared data store, as in block 440, the encrypted customer security rule set may be retrieved from the shared data store. For example, a notification may be generated by a data store service that informs the computing service provider that the encrypted customer security rule set has been stored to the shared data store. In another example, a computing service provider may monitor the shared data store for encrypted customer security rule sets that have been added to the shared data store.

The encrypted customer security rule set may be copied to a server that hosts the application firewall that provides an entry point to the customer's application. In one example, the encrypted customer security rule set may be copied to volatile memory of the server, where as in block 450, the encrypted customer security rule set may be decrypted in the volatile memory. In another example, the encrypted customer security rule set may be copied to non-volatile memory on the server and the encrypted customer security rule set may be decrypted in volatile memory, after which, the encrypted customer security rule set may be deleted from the non-volatile memory. Decrypting the encrypted customer security rule set in the volatile memory results in forming a corresponding unencrypted customer security rule set in the volatile memory. As in block 460, the unencrypted customer security rule set may be registered with the application firewall. For example, a memory address for a memory location containing the unencrypted customer security rule set may be provided to the application firewall and the application firewall may begin applying the customer security rule set to network traffic associated with the customer's application.

FIG. 5 is a flow diagram illustrating an example method 500 for failing over to a default security rule set in the event that a customer security rule set cannot be applied to an application firewall that provides an entry point to the customer's application. A failure to load an encrypted customer security rule set for use by an application firewall may be the result of, for example, a failure to decrypt the encrypted customer security rule set in volatile memory, or a failure to retrieve the encrypted customer security rule set from a storage location.

In the event that a customer's encrypted security rule set cannot be loaded on an application firewall, a failover profile for the customer may be identified, as in block 502. The failover profile may include information for a default security rule set that may be used in place of the customer's security rule set that could not be loaded on the application firewall. A default security rule set may include security rules defined by a computing service provider, or may include non-proprietary default security rules selected by the customer. The security rules may be defined for use with applications that may be the same or similar to the customer's application, or the security rules may include generic security rules used to filter or monitor network traffic associated with multiple types of applications.

The failover profile for the customer may be used to determine, as in block 504, whether the customer has specified a default security rule set to load in place of the customer's security rule set. In the case that the customer has specified a default rule set as indicated in the failover profile, then as in block 506, the default security rule set specified by the customer may be retrieved, and as in block 510, the default security rule set may be loaded on the application firewall and applied to network traffic associated with the customer's application. In the case that the failover profile does not specify a default security rule set, then as in block 508, a default security rule set specified by the computing service provider may be retrieved and loaded on the application firewall.

Figure 6:
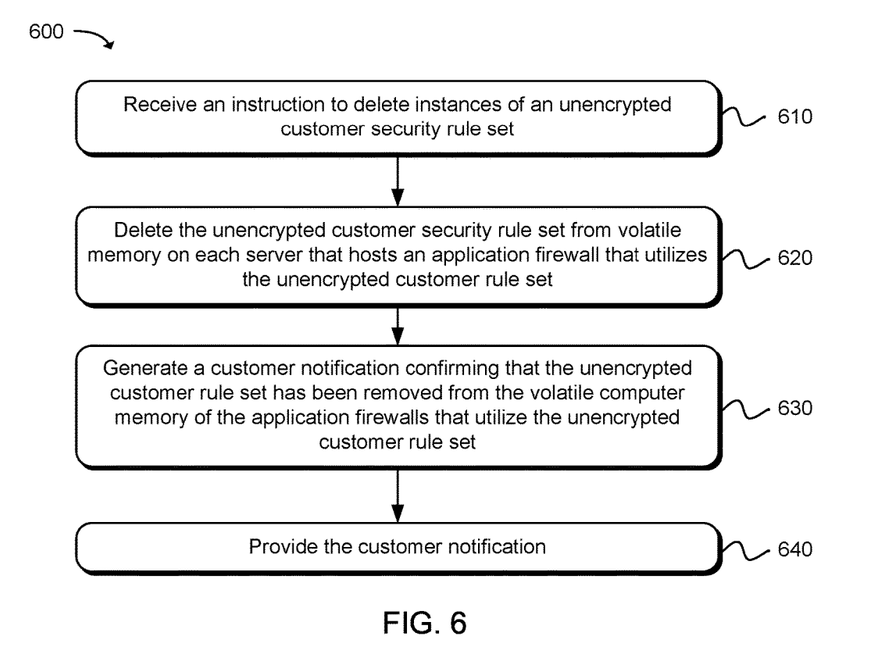
FIG. 6 is a flow diagram illustrating an example method for decommissioning an unencrypted customer security rule set from volatile computer memory of application firewalls utilizing the unencrypted customer security rule set.

FIG. 6 is a flow diagram that illustrates an example method 600 for notifying a customer that instances of an unencrypted customer security rule have been removed from the volatile computer memory of servers hosting application firewalls that may have contained the unencrypted customer security rule. In response to a request by a customer to discontinue use of the customer's security rule set on application firewalls, an instruction may be received to delete instances of the encrypted customer security rule from servers, as in block 610.

In response to receiving the instruction, the unencrypted customer security rule set may be deleted from the volatile memory of each server hosting an application firewall that utilizes the unencrypted customer rule set, as in block 620. In one example, profiles for various application firewalls may be queried to identify the application firewalls that may be currently applying the unencrypted customer security rule set to network traffic monitored by the application firewalls. The unencrypted customer security rule set may then be deregistered from each of the application firewalls identified and the unencrypted customer security rule set may be removed from volatile computer memory of the application firewalls (e.g., removed from volatile memory of the servers hosting the application firewalls or from the volatile memory of application firewall devices).

After the unencrypted customer security rule set has been removed from volatile memory, a customer notification may be generated confirming that the unencrypted customer rule set has been removed from the volatile computer memory of the application firewalls (e.g., volatile memory of the servers hosting the application firewall), as in block 630. For example, the customer notification may itemize the application firewalls that utilized the unencrypted customer rule set and may provide confirmation that the unencrypted customer security rule set has been deregistered and deleted from each of the application firewalls, thereby accounting for each copy of the unencrypted customer security rule set that had been in use by application firewalls. As in block 640, the notification may then be provided to the customer who may review the notification and be provided with an assurance that unencrypted copies of the customer rule set have been destroyed.

Figure 7:
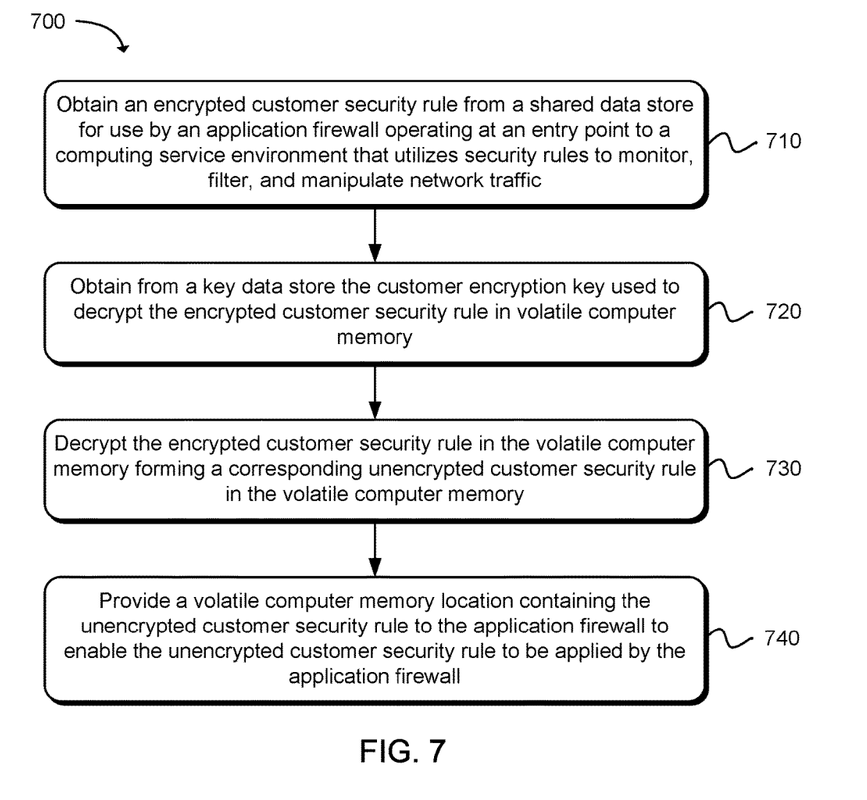
FIG. 7 is a flow diagram that illustrates an example method for securely loading a customer security rule in volatile computer memory of an application firewall.

FIG. 7 is a flow diagram illustrating an example method 700 for applying an encrypted customer security rule to an application firewall. Beginning in block 710, an encrypted customer security rule may be obtained from a shared data store for use by an application firewall operating at an entry point to a computing service environment that utilizes security rules to monitor, filter, and manipulate network traffic. The encrypted customer security rule may be owned by the computing service customer and the encrypted customer security rule may be encrypted using a customer encryption key owned by the computing service customer.

In one example, one or more application firewalls providing an entry point to the computing service customer's application may be identified. As in block 720, the customer encryption key that was used to encrypt the customer security rule may be obtained from a key data store. The key data store may be a repository for the customer encryption key and the computing service customer may grant the computing service provider access to the key data store. In one example, a cross-account security role may be created that grants the computing service provider access to the customer encryption key stored in the key data store.

As in block 730, the encrypted customer security rule may be decrypted in the volatile computer memory using the customer encryption key, thereby forming a corresponding unencrypted customer security rule in the volatile computer memory. Thereafter, as in block 740, a volatile computer memory location containing the unencrypted customer security rule may be provided to the application firewall to enable the unencrypted customer security rule to be applied by the application firewall. For example, the unencrypted customer security rule may be registered with the application firewall, which may be configured to apply the unencrypted customer security rule set to network traffic received at the application firewall.

Figure 8:
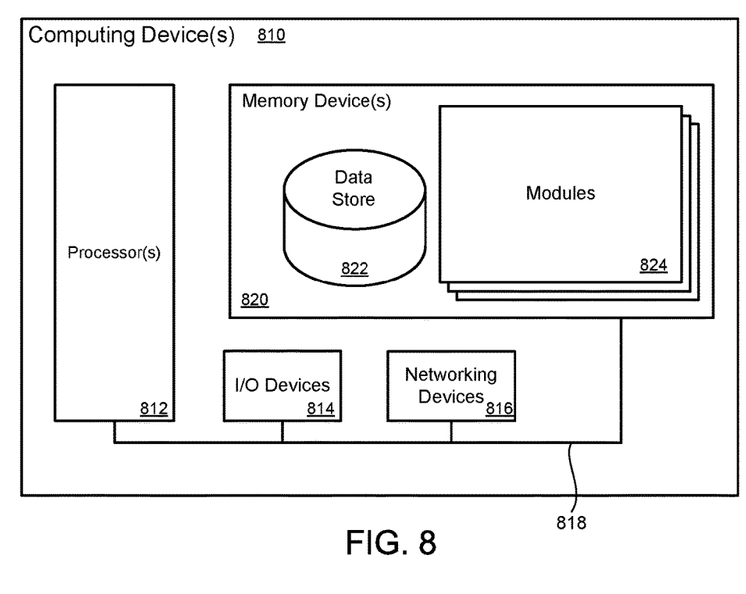
FIG. 8 is block diagram illustrating an example of a computing device that may be used to execute a method for decrypting encrypted customer security rules for use by an application firewall.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. For example, the memory device may contain a rule retrieval module, a key retrieval module, a rule decryption module, a rule retention module, as well as other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812.

Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for applying an encrypted customer security rule set to an application firewall, comprising:
at least one processor;
a memory device including instructions that, when executed by the at least one processor, cause the system to:
receive an automated notification from a shared data store that an encrypted customer security rule set is available for use by the application firewall operating on a server at an entry point to a computing service environment, wherein the application firewall is a managed service provided by a computing service provider for use with an application hosted in the computing service environment and the application firewall utilizes customer security rules to monitor, filter, and manipulate network traffic associated with the application;
obtain the encrypted customer security rule set from the shared data store accessible to a computing service customer and the computing service environment, wherein the encrypted customer security rule set is owned by the computing service customer and the encrypted customer security rule set is encrypted using a customer encryption key owned by the computing service customer;
obtain the customer encryption key from a key management system using a cross-account security role that provides access to the customer encryption key, wherein the computing service customer creates the cross-account security role granting access to the customer encryption key;
decrypt the encrypted customer security rule set in volatile computer memory of the application firewall forming a corresponding unencrypted customer security rule set in the volatile computer memory; and
register the unencrypted customer security rule set located in the volatile computer memory with the application firewall, wherein the application firewall is configured to apply the unencrypted customer security rule set to network traffic received at the application firewall.

2. A system as in claim 1, wherein the memory device includes instructions that, when executed by the at least one processor, causes the system to further determine a status of the cross-account security role configured to grant access to the customer encryption key.

3. A system as in claim 1, wherein the memory device includes instructions that, when executed by the at least one processor, causes the system to further:
determine that the customer encryption key used to unencrypt the encrypted customer security rule set is unavailable;
remove the unencrypted customer security rule set from the volatile computer memory; and
register a default security rule set with the application firewall.

4. A computer implemented method, comprising:
obtaining an encrypted customer security rule from a shared data store for use by an application firewall operating on a server at an entry point to a computing service environment that utilizes security rules to monitor, filter, and manipulate network traffic associated with an application hosted in the computing service environment,
wherein the application firewall is a managed service provided by a computing service provider for use with the application and the encrypted customer security rule is owned by a computing service customer and the encrypted customer security rule is encrypted using a customer encryption key owned by the computing service customer;
obtaining from a key data store the customer encryption key used to decrypt the encrypted customer security rule in volatile computer memory;
decrypting the encrypted customer security rule in the volatile computer memory forming a corresponding unencrypted customer security rule in the volatile computer memory; and
providing a volatile computer memory location containing the unencrypted customer security rule to the application firewall to enable the unencrypted customer security rule to be applied to network traffic associated with the application hosted in the computing service environment.

5. A method as in claim 4, further comprising receiving a push notice that the encrypted customer security rule has been added to the shared data store by the computing service customer.

6. A method as in claim 4, further comprising polling the shared data store for the encrypted customer security rule.

7. A method as in claim 4, wherein obtaining the encrypted customer security rule further comprises obtaining the encrypted customer security rule from a shared data object store accessible to the computing service customer and a computing service provider.

8. A method as in claim 4, wherein obtaining the customer encryption key further comprises obtaining the customer encryption key from a key management system that includes a hardware security module.

9. A method as in claim 8, further comprising obtaining the customer encryption key using a cross-account security role created by the computing service customer that provides revocable rights to a computing service provider to use the customer encryption key in decrypting the encrypted customer security rule in the volatile computer memory.

10. A method as in claim 4, further comprising:
receiving a request from the computing service customer to discontinue utilization of the unencrypted customer security rule by the application firewall; and
removing the unencrypted customer security rule from the volatile computer memory.

11. A method as in claim 4, further comprising:
receiving a shared data store notification that the encrypted customer security rule has been deleted from the shared data store; and
removing the unencrypted customer security rule from the volatile computer memory.

12. A method as in claim 4, further comprising generating a customer notification that confirms that the unencrypted customer security rule has been removed from the volatile computer memory.

13. A method as in claim 4, further comprising receiving instructions to associate the application firewall with a customer account for the computing service customer.

14. A method as in claim 4, wherein the application firewall is an entry point to a content delivery network service that distributes customer content associated with the computing service customer to end users.

15. A method as in claim 4, wherein the application firewall monitors and filters network traffic associated with multiple computing service customers using customer security rules defined by the computing service customers.

16. A method as in claim 4, further comprising updating an application firewall profile that provides a record of unencrypted customer security rules utilized by the application firewall to indicate that the unencrypted customer security rule is located in the volatile computer memory.

17. A method as in claim 4, further comprising updating an application firewall profile with instructions to failover to a default security rule specified by the computing service customer or by a computing service provider in response to a failure to decrypt the encrypted customer security rule in volatile computer memory.

18. A non-transitory machine readable storage medium having instructions embodied thereon, the instructions when executed by at least one processor:

receive, via a push channel, an encrypted customer security rule for use by an application firewall that operates on a server at an entry point to a computing service environment, wherein the application firewall is a managed service provided by a computing service provider for use with an application hosted in the computing service environment, and the application firewall utilizes security rules to monitor, filter, and manipulate network traffic associated with the application, and the encrypted customer security rule is owned by a computing service customer and is encrypted using a customer encryption key owned by the computing service customer;

obtain the customer encryption key from a key management system using a cross-account security role that provides access to the customer encryption key for use in decrypting the encrypted customer security rule in volatile computer memory;

decrypt the encrypted customer security rule in the volatile computer memory forming an unencrypted customer security rule in the volatile computer memory; and register the unencrypted customer security rule located in the volatile computer memory with the application firewall, wherein the application firewall is configured to apply the unencrypted customer security rule to network traffic received at the application firewall.

19. A non-transitory machine readable storage medium as in claim 18, wherein the encrypted customer security rule is pushed to a server executing the application firewall in response to the encrypted customer security rule being added to a shared data store.

20. A non-transitory machine readable storage medium as in claim 18, wherein the instructions that when executed by the at least one processor further delete the encrypted customer security rule from computer memory after decrypting the encrypted customer security rule in volatile memory.

* * * * *